United States Patent [19]

Lemelson

[11] 3,918,029

[45] Nov. 4, 1975

[54] SCANNING SYSTEM AND METHOD

[76] Inventor: Jerome H. Lemelson, 85 Rector St., Metuchen, N.J. 08840

[22] Filed: May 22, 1973

[21] Appl. No.: 362,676

Related U.S. Application Data

[63] Continuation-in-part of Ser. No. 160,007, July 8, 1971, Pat. No. 3,735,350, which is a continuation-in-part of Ser. No. 806,398, March 12, 1969, abandoned, which is a continuation-in-part of Ser. Nos. 665,526, Sept. 5, 1967, and Ser. No. 526,546, Feb. 10, 1966, Pat. No. 3,499,650, which is a continuation of Ser. No. 826,370, July 10, 1959, abandoned, which is a continuation-in-part of Ser. No. 450,131, Aug. 16, 1954, abandoned.

[52] U.S. Cl. .................. 340/146.3 SY; 235/61.11 E; 340/146.3 Z

[51] Int. Cl.[2] .......................................... G06K 7/10

[58] Field of Search .................... 235/61.11 E, 61.9; 340/146.3 SY, 146.3 Z; 250/227; 179/100.1 R

[56] References Cited

UNITED STATES PATENTS

| | | | |
|---|---|---|---|
| 2,420,716 | 5/1947 | Morton et al. | 340/146.3 SY |
| 3,172,081 | 3/1965 | Cerf | 340/146.3 Z |
| 3,578,953 | 5/1971 | Milford et al. | 340/146.3 Z |
| 3,671,722 | 6/1972 | Christie | 340/146.3 K |
| 3,676,644 | 7/1972 | Vaccaro et al. | 340/146.3 Z |
| 3,700,858 | 10/1972 | Murthy | 340/146.3 Z |
| 3,703,628 | 11/1972 | Philipson | 340/146.3 Z |
| 3,744,025 | 7/1973 | Bilgutay | 340/146.3 Z |

*Primary Examiner*—Leo H. Boudreau

[57] ABSTRACT

A photoelectric scanning system is provided for scanning coded information printed on record members. The system includes a hand held implement having a tubular housing, which implement is shaped and connected to a code receiving unit in such a manner as to permit it to be easily held and manipulated between the thumb and forefinger of the hand in a scanning sweep across the surface of the record member.

In one form, the scanning implement contains a lens disposed at one end thereof which may be easily located adjacent a code printed on a record member and may be guided by hand in the direction of the code to variably reflect light into the implement through a passageway at the tip of the implement and into a photoelectric cell located within the implement. Means may also be provided for guiding the implement in a fixed path across a record member such that a coded track thereof is photo-optically scanned by the implement.

15 Claims, 25 Drawing Figures

SCANNING SYSTEM AND METHOD

RELATED APPLICATIONS

This is a continuation-in-part of application Ser. No. 160,007 filed July 8, 1971, for Code Scanning System, now U.S. Pat. No. 3,735,350, which was a continuation-in-part of Ser. No. 806,398 filed Mar. 12, 1969, now abandoned, as a continuation-in-part of Ser. No. 665,526 filed Sept. 5, 1967, and Ser. No. 526,546 filed Feb, 10, 1966, now U.S. Pat. No. 3,499,650, the latter application being a continuation of Ser. No. 826,370 filed July 10, 1959, now abandoned, which in turn was a continuation-in-part of Ser. No. 450,131 filed Aug. 16, 1954, and now abandoned.

SUMMARY OF THE INVENTION

This invention relates to an apparatus and method for reading codes printed on record members or substrates by photo-optically scanning said codes with a hand held implement which is caused to effect sliding movement across that portion of the surface of the record member containing the code.

The instant invention is concerned primarily with improvements in photoelectric scanning implements associated with systems for photo-optically generating information by scanning printed codes.

A number of hand held implements have been proposed for reading printed data provided on record members such as the implement disclosed in U.S. Pat. No. 3,238,501. The instant invention is concerned primarily with improvements in the structure of a hand held photo-optical reader which permit it to be easily manipulated and guided by hand across a printed code line or strip. The implement disclosed in the U.S. Pat. No. 3,238,501 patent is difficult to manipulate and requires a special fixture to guide it in a predetermined path across the record member. The fixture, due to its size and shape, masks and distorts the images printed on the record member and the end of the implement cannot itself be easily located with respect to the record member as it extends substantially outward from the main body of the implement rendering it quite difficult to properly locate the scanning axis of the implement and guide same in a path across the record member without the use of the fixture. The fixture itself requires substantial effect to properly align it with the record member and is difficult to manipulate and align.

Accordingly, it is a primary object of this invention to provide a new and improved system for photo-optically scanning printed matter on record members.

Another object is to provide an improved structure in a hand held implement for photo-optically scanning printed information.

Another object is to provide improved means for guiding a hand held implement in scanning selected information printed on a record member.

Another object is to provide an improved assembly in a hand held photo-optical reader unit and an output cable connected thereto for transmitting signals representative of the recordings scanned by the implement.

Another object is to provide a system for generating coded information composed of tone signals of different frequency from optically scannible printed recordings.

Another object is to provide a simple apparatus for generating code signals representative of selected information which may be used in automatic communication systems.

Another object is to provide an apparatus for manually selecting and generating tone signals in coded arrays applicable for automatic telephone circuit switching and connection.

With the above and such other objects in view as may hereafter more fully appear, the invention consists of the novel constructions, combinations and arrangements of parts as will be more fully described and illustrated in the accompanying drawings, but it is to be understood that changes, variations and modifications may be resorted to which fall within the scope of the invention as claimed.

In the drawings:

FIG. 1 is a schematic diagram illustrating a reading device for generating coded electrical signals in scanning a sheet of recordings and output means for gating and utilizing said signals;

FIG. 1*a* shows one form of coding arrangement for an alphabetical character, the coding arrangement being based on the number and or location of a plurality of printed spots;

FIG. 1*b* is a coding arrangement for an alphabetical character based on pulse duration modulation;

FIG. 1*c* is a coding arrangement for alphabetical characters based on binary notations;

FIG. 1*d* is a coding arrangement for an alphabetical character based on printed marks which vary in grayness or color;

FIG. 1*e* is a coding arrangement for an alphabetical character utilizing pulse and/or tone signal recordings on magnetic recording material disposed adjacent to or across said character;

Figure 14:
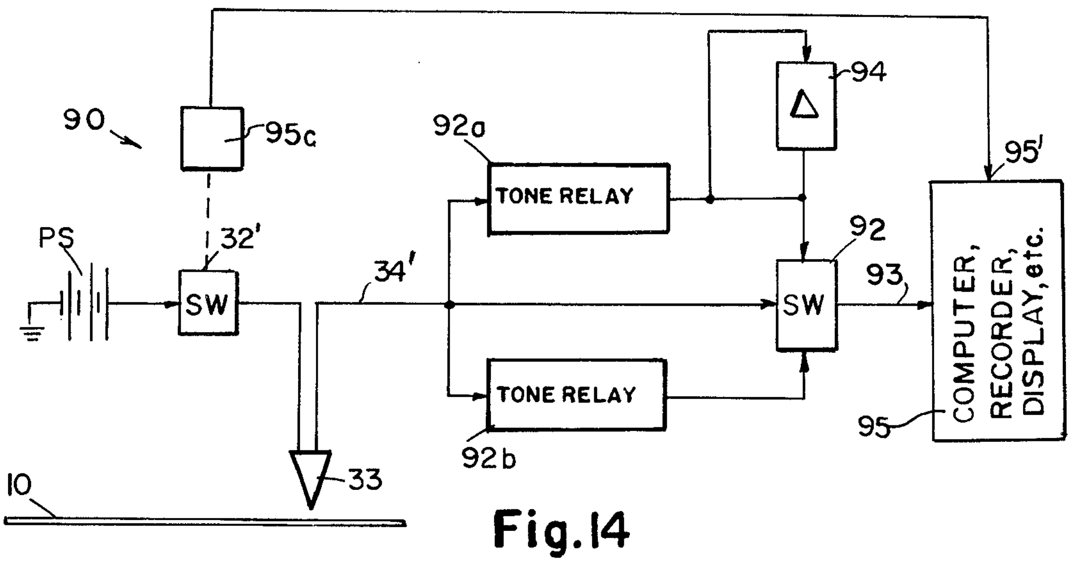
Figure 15:
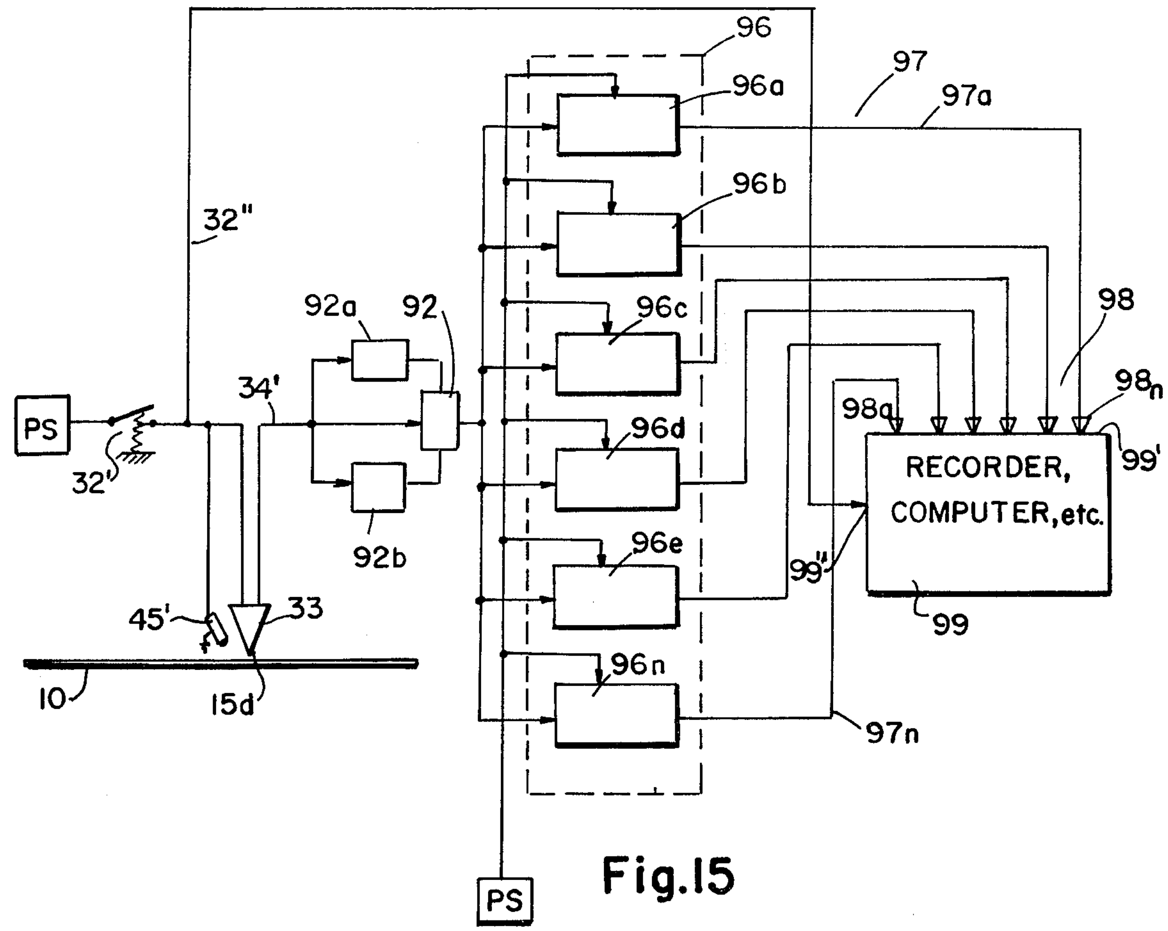
Figure 16:
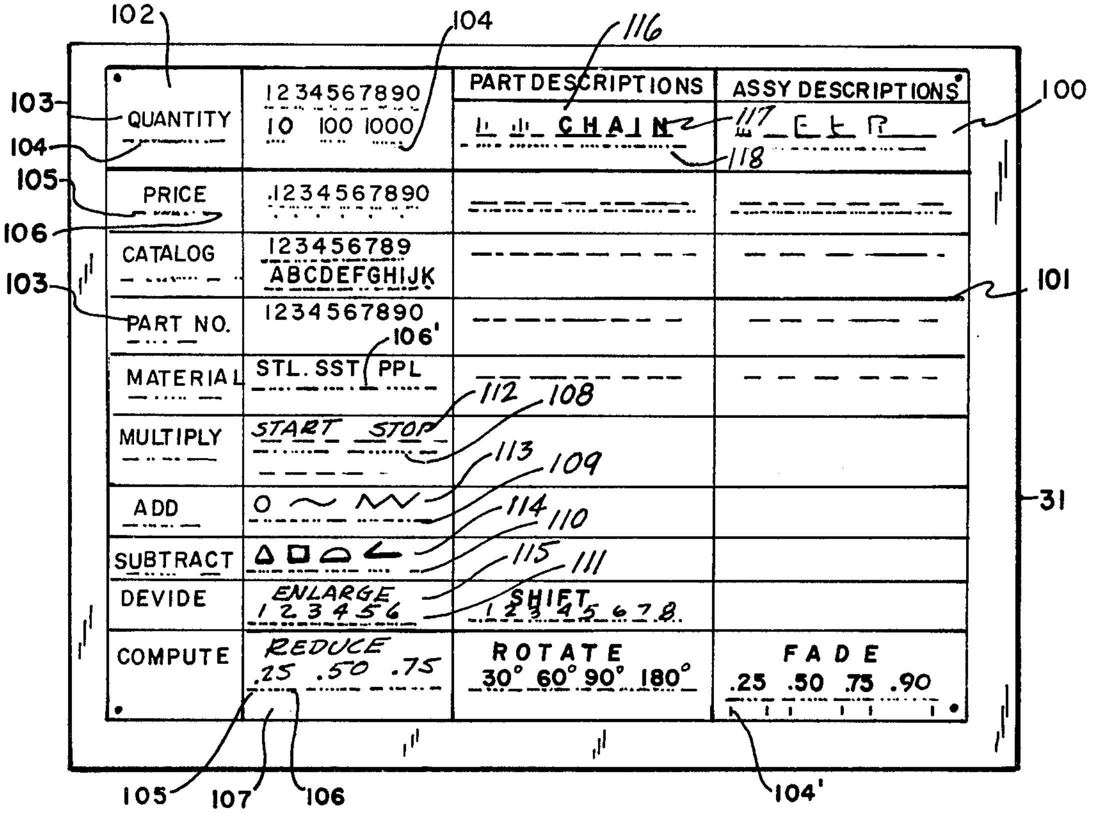

FIG. 14 is a control diagram for reading apparatus of the type defined in the instant invention, and FIG. 15 is a control diagram for reading apparatus employing variable tone recordings, FIG. 16 is a plan view of a layout sheet for information to be selectively scanned to generate data by means of the reading devices of FIGS. 1 and 5–9, and FIG. 17 shows a personal record card having coded information recorded thereon identifying the holder thereof which information may be scanned to generate codes by the means employed to scan the sheet of FIG. 16 permitting variable information on the card holder to be generated along with the information generated in scanning a sheet such as provided in FIG. 16.

Figures 17, 18, 19, 20:
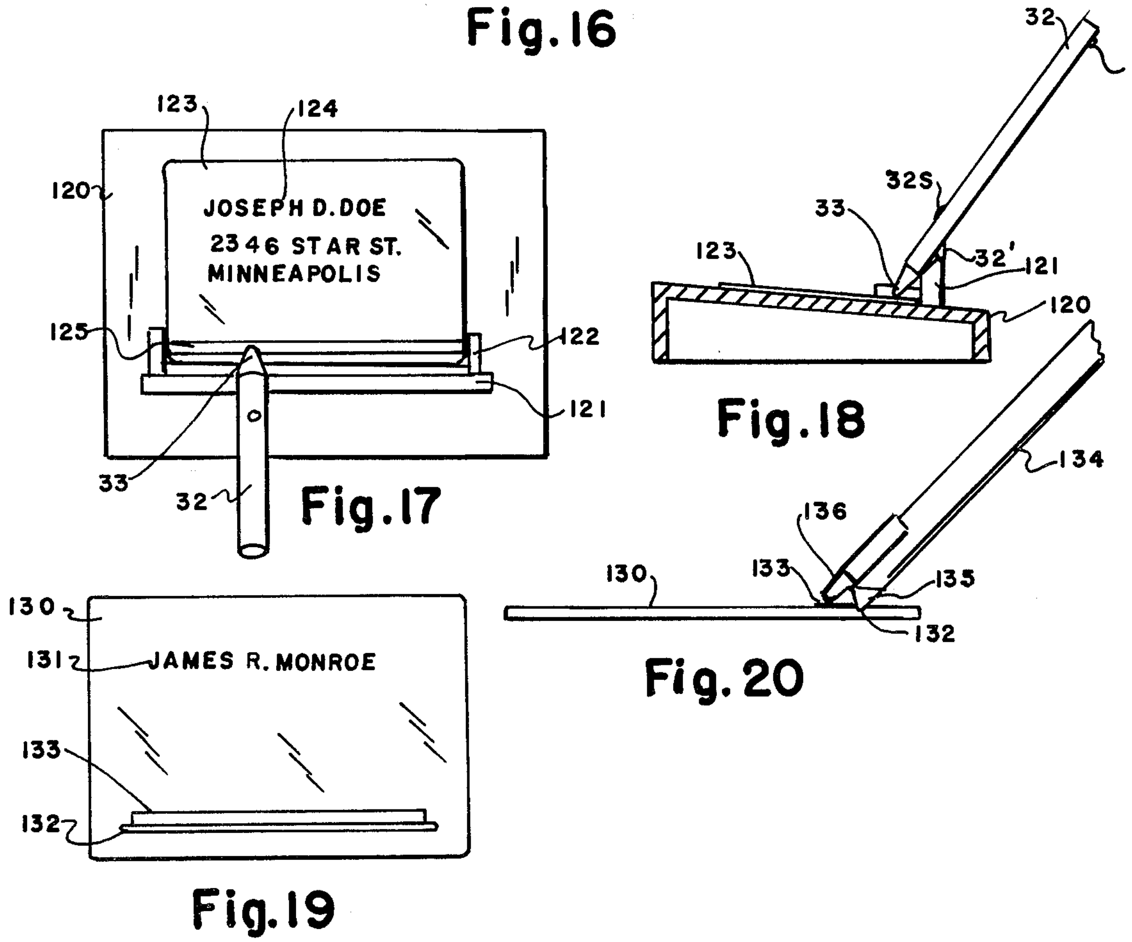

FIG. 18 shows a support for a record card containing codes of the type illustrated in FIGS. 1*a* – 1*e* and 2 – 4.

FIG. 19 is a plan view of the modified record card applicable to the instant invention.

FIG. 20 is a side view of the modified record card applicable to the instant invention.

GENERAL DESCRIPTION OF THE SYSTEM

The information to be generated is recorded on flat sheet record members such as photographic film, paper, metal foil or plastic sheet, preferably in the form of a list or word dictionary describing in language form such variables as names, addresses, products, materials, destinations, machinery, components, diagnosis results, physical or chemical conditions, formulas, etc. Quantities or magnitudes may also be expressed by numerical notations while qualitative information such as above may be expressed as one or more words photographically developed or printed along a line to be scanned. Printing may be effected by photographic means or conventional printing means using conventional printing ink. The printed characters may be photo-optically or magnetically scanned and digitized or coded for computer entry or, more preferably, coded representations provided below, above or between the printed characters may be scanned when a hand-held or hand positioned transducer is either manually directed or power driven along or adjacent to the line of characters selected for scanning. Push button control means are provided to initiate and control the generation of data and the entry of selected information and auxiliary means may be provided to enter fixed information such as coded information representative of a name and address generated in reading a card. The code electrical signals generated by scanning may be utilized to control a print-out device such as an electric typewriter.

Figures 1, 1A, 1B, 1C, 1D, 1E, 2, 3, 4, 5, 6:
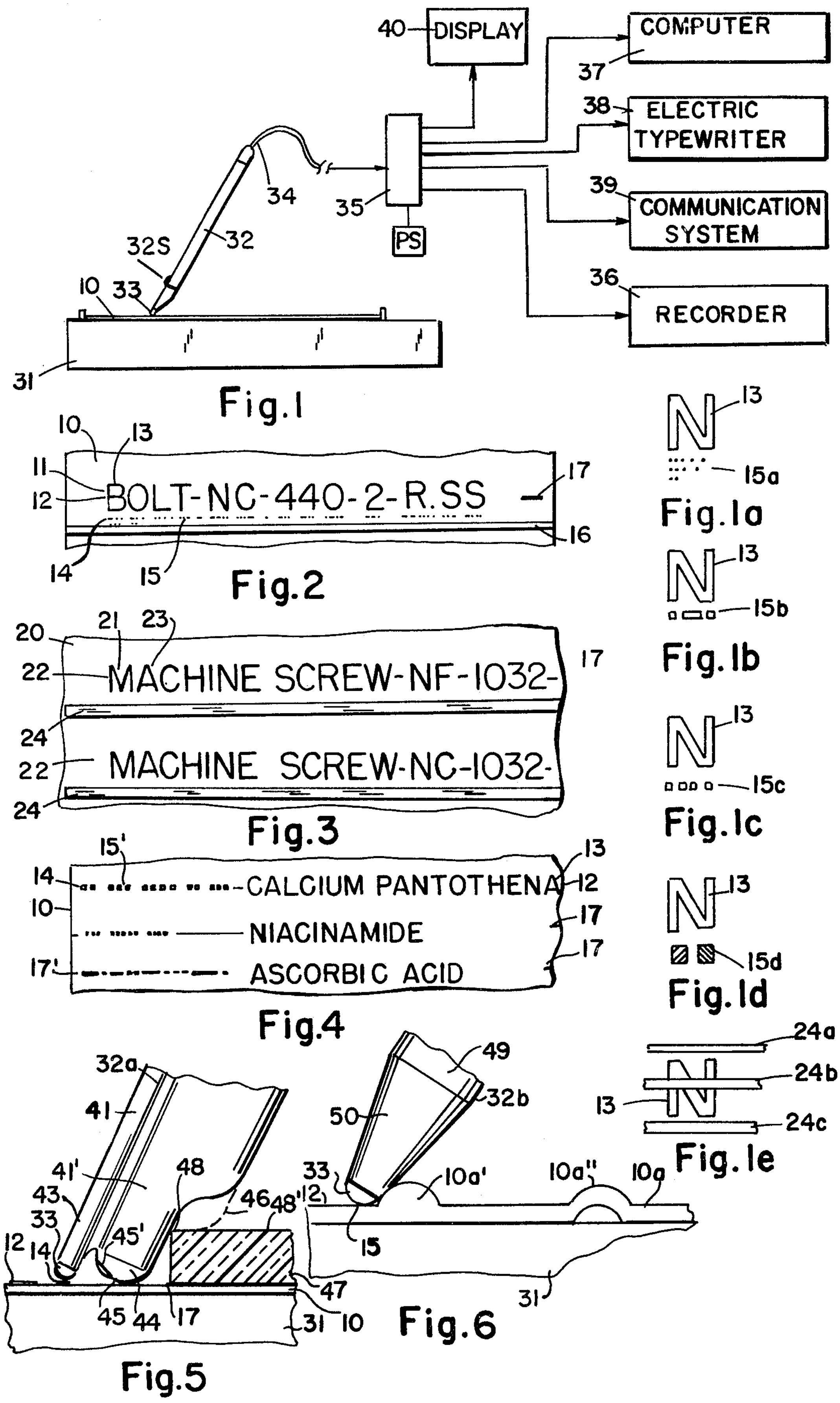
FIG. 2 shows a layout for a portion of a sheet containing alpha-numeric characters printed to define human readable intelligence and code recordings disposed immediately beneath each line of a plurality of lines of said characters provided on said sheet.
FIG. 3 is a view of a portion of a sheet containing plural lines of human readable information in the form of printed alpha-numeric characters and magnetic recording means for codes disposed adjacent to said characters.
FIG. 4 is a view of a portion of a sheet containing a plurality of lines of information in the form of lines of printed alpha-numeric characters and electro-optically scannable code recordings adjacent to and at the side of each line of characters.
FIG. 5 is a side view of part of a reading device of the type shown in FIG. 1 or a modified form thereof aligned with a sheet containing recorded information to be scanned thereby.
FIG. 6 is a side view of another form of reading device for information contained on a sheet which sheet or overlay therefore contains guide means for the reading device.

FIG. 1 illustrates the major components of one preferred form of data entry system 30 comprising the instant invention. A sheet 10 of paper, plastic or metal foil containing lines of printed alpha-numeric characters and coded information, as will be described hereafter, is disposed on the upper surface of a supporting member 31 which may comprise a board, desk or special device. Code reading and generation is effected by moving a device 32 by hand or motor powered means across or immediately adjacent to a selected line of intelligible information printed in the form of words and numbers on the sheet 10 so as to cause a transducer 33, or optical element extending to a photoelectric transducer within member 32, to scan the printed coded information associated with the selected line of visually readable intelligible information and to generate variable pulse or tone signals on the output 34 which is connected to the transducer 33. The output 34 may extend directly to one or more of a plurality of devices such as a magnetic recorder 36, computer 37, electric typewriter 38 or communication system 39, such as a telephone switching system connecting the reading device with a remote recorder or computer or a display unit 40. The recorder 36 may also be later operated in its reproduction mode to generate the recorded signals associated with a plurality of line readings or transactions and transmit said signals to a computer at a remote location. Notation 35 refers to a switching control panel for switching the output 34 to one or more of the subsystems and devices 36 to 39 which control panel may also contain switching means for starting and stopping the recorder 36, or typewriter 38 and effecting connections to a terminal circuit of the automatic switching system 39. The electric typewriter 38 may be utilized to provide a print-out of the information scanned to serve as a record of what was scanned. The unit 40 which may supplement or replace the typewriter 38, may comprise means such as a cathode ray tube or other device for displaying the information scanned as alpha-numeric characters on the screen of the tube thereof from which hard copy may be selectively generated. The unit 40 may also contain means for transducing the signals generated in scanning the selected characters or representations thereof which are recorded adjacent thereto to sounds such as verbal representations of the scanned information. For example, if the information scanned comprises words, phrases or sentences, the recorded material may be derived from the voice recordings in reading the printed characters serving to provide audio descriptions thereof when scanned and reproduced. In a modified form, the recording area adjacent the printed characters may contain both the described code recordings representative of the characters and sound recordings which may be simultaneously reproduced with the reproduction of the code recordings and transduced to electrical signals which are used to modulate a speaker for generating verbal descriptions of the words or characters provided in line 12. Thus, the user of the apparatus may be provided with audio reproductions of the material scanned which he may listen to so as to ascertain the nature of the scanned information as a check to assure that the information so scanned is in accordance with that which he sought to select. If magnetic recording material is provided adjacent each line 12 of visible characters, then the audio and code recordings may be provided on a single track to be reproduced by transducing means as described hereafter and filtered to separate the code from the audio recordings or may be recorded on separate tracks to be simultaneously reproduced by separate pick-ups associated with the reading device utilized to scan a line of information at a time.

In FIG. 1 notation 32S refers to a switch 32S in series circuit with the scanning transducer 33 and a power supply PS which switch is preferably spring biased or otherwise provided in a normally open condition to prevent the generation of signals on the output line 34 resulting, for example, when and if the transducer 33 becomes energized in scanning non-wanted information or during its handling or movement across the sheet 10 or through the spacial volume adjacent thereto in relocating, picking up or putting down same between reading operations. The switch 32S may be a force operated mono-stable normally open switch which is closed by the pressure of the fingers grasping the lower end portion of the device 32 or by other means such as movement of the forefinger thereagainst just prior to initiating the scanning of a particular line or portion of a line of coded information. The switch 32S may also be operated by other means such as capacitance, resistance or photo-electric relays may be located as shown or remote from the device 32 to be operated by the foot of the operator or by the fingers of his other hand.

FIGS. 1a to 1b illustrate a number of different character and code arrangements applicable to the sheet 10 and preferably in the form of parallel lines of characters forming words, phrases or sentences to be selectively scanned by the line or portions of a line of such characters. In FIG. 1*a*, an alphabetical character 13 in the form of the letter N is printed on the sheet 10 and contains coded information 15*a* in the form of a plurality of small dots or opaque spots 15a' which are optically scannable by one or more transducers such as photoelectric cells or the like, preferably disposed in alignment with one or more optical fibers terminating at the end or tip portion 33 of the reading device 32. The number of printed dots or spot areas 15*a'* and/or their relative positions on one or more lines or levels of said spot areas may be significant in forming the code 15*a* associated with the character 13 so that when they are photo-optically scanned and effect the generation of pulse electrical signals, they may be used to automatically activate a counting means or other device which may include logical circuit means for determining the code and discriminating same from other codes so as to determine the character which the code represents.

In FIG. 1b, the code 15*b* comprises a single line of dots and dashes so shaped and spaced as to provide, when reproduced as the scanning device 32 is manually or machine driven across the sheet 10 in alignment with the line of codes 15*b*, the number and particular arrangement of short and long electrical signals generated in scanning each group of dots and dashes or code 15*b* may be utilized to identify the printed character 13.

In FIG. 1*c*, a code 15*c* comprises a plurality of small spots or dots 15*c'*, each of similar shape and spaced from each other such that all of the markings 15*c'* aligned with a particular character 13 will generate a series electrical binary code when scanned which code is representative of the particular character 13 with which it is associated.

In FIG. 1d, each character 13 has disposed immediately beneath said character, one or more areas 15*b'* defining the code 15*d* associated with said character, said areas 15*b'* varying from character to character or code to code in color and/or shades of gray such as the shades of gray found in the so-called gray scale. If the transducing means utilized to scan the code 15*d* is a photo-optical device such as a photoelectric cell, or photo-transistor, less light will reach said cell in reflecting off darker gray or black areas 15*b'* than lighter gray areas thereof, resulting in proportionate variations in the amplitude or frequency of the signal generated by said photoelectric cell. Such variations in the output of the photoelectric cell signals may be defined variations in frequency or tone or may be converted to same which variable electrical tone signals may define different codes or identifying signals for different characters 13 whereby there is at least one specific tone signal or group of tone signals associated with each character.

In FIG. 1*e*, the printed character 13 is shown disposed beneath a narrow band 24*a* of magnetic recording material and also has a second narrow band 24*b* of magnetic recording material extending therethrough without loss of identity of the character. A third band 24*c* of magnetic recording material is shown running beneath the character 13. The three bands 24*a*, 24*b* and 24*c* may be simultaneously printed in the locations shown or one or more of these may be provided to attain magnetic recordings of code or tone signals associated with each character 13 and operative, when reproduced by a magnetic pick-up, to identify the character by generating electrical tone or code signals associated with each character. In other words, any one or all of the magnetic recording strip areas 24*a* to 24*c* may contain one or more tone or pulse recordings associated with the alphanumeric character 13 with which it is aligned so that when a magnetic pick-up transducer scans the strip or strips, it will generate a code or tone array of signals in scanning past the particular character and said signals may be transmitted to a storage device or computer operative to utilize same for record-keeping purposes, computing purposes, and/or for the operation of one or more devices such as an electric typewriter, display cathode ray or other device.

In another form of code recording which may be employed to provide information signal generating means when scanned by the pick-up apparatus of the instant invention various luminescent inks may be utilized to print visible or invisible code marks of the types provided in FIGS. 1*a* to 1e to be read or picked-up by suitable photoelectric detection means provided at the tip or in the shank of the scanning device. For example, the code may be printed in a single color luminescent ink detected with a photoelectric transistor or other form of photocell having a suitable optical filter for passing ultraviolet light modulated by the luminescent ink spot recordings. Suitable ultraviolet light generating means may be mounted on or within the shank of the reading device or its support or on the support for the sheet of paper or film containing the characters and codes and directed to illuminate the area being scanned. The DMS Luminescent Inks produced by the American Cyanimid Company of Bound Brook, N.J. and described in their technical bulletin No. 8-2569-250-12/68 may be employed and may be printed by means of all types of conventional printing presses. Certain of these ink pigments are invisible to the human eye under ordinary light and accordingly, codes or characters may be printed therewith on or along the visible printed characters 13 of the information to be entered without detracting from said visible characters and the ability of the operator to read same. Such invisible codes may be printed along one or more lines or tracks which so located that when the reading pen or motorized device is properly aligned with the line of visible characters such as directly therealong or along the bottom edge of each character, the code recordings will be scanned and will generate electrical codes as described.

The described grey scale or color may also be replaced or supplemented by using a variety of different colors of luminescent inks in printing code marks. For example, printed spots of different colored luminescent inks may be operative, when photoelectrically scanned as described, to generate different tone signals on the output circuit of the reader by utilizing a tone filter matrix. To generate codes consisting of composite tones or tone trains, spots of different colors of luminescent inks may be printed closely adjacent each other with each associated readable character containing a particular grouping of colored spots operative to generate a particular array of tone signals on the output of the reading circuitry to define a tone code identifying said character. The entire area occupied by an alphanumeric character may also be scanned by the reading devise whereupon different colors may be conveniently located permitting the reading device to simultaneously scan all colors for a character and generate composite tone signals on its output thereby eliminating the need to precisely align the reading device with other than a line of character or words being scanned.

In FIG. 2 is shown details of the information recorded on record member 10 which member is provided in the form of a sheet such as a sheet of paper, plastic or metal foil or any of these materials disposed beneath a sheet of clear plastic or glass. The sheet 10 contains printed matter 11 provided as a plurality of lines 12 of intelligible information such as typewritten or printed words or phrases and each line composed of one or more words or alpha-numeric representations of products, components, materials, locations, names or other variables to be used in describing a transaction such as a purchase, service or the like. The first four individual alphabetical characters 13 of FIG. 1 describe a particular fastener, a bolt, while the remaining alpha-numeric characters describe its threads, diameter, length, head, material, etc. Shown printed below each printed character 13 is a code 15 identifying said character. The code line 14 comprises a train of spaced printed dots or dashes defining bit trains or binary codes 15 defined by the dots and spacing or short marks which vary in color or grayness for generating varying tone or frequency signals when photo-optically scanned. All character codes of a line of characters being disposed along a line or narrow band area denoted 14, there being one or more of such code lines for each line of characters 13 extending parallel thereto. The codes 15 for each line may also extend as a line above the line of characters they represent or directly along the line of characters preferably although not necessarily provided as a different code disposed between each printed character and all at the same level along a straight line parallel to the line of printed characters. For example, if the printed characters are printed in conventional ink, codes identifying each may be printed thereover in magnetic ink. Said code may be dot or bar printings operative to generate pulse chains or binary codes when scanned as described herein. Notation 17 refers to a mark locating line 12 which the operator may use to align said line with the scanning device by moving the latter or sheet 10. While the record member 10 may be utilized per se with a reading pen containing a scanning transducer either guided by hand in sliding movement across the line 14 of codes 15 or guided along the edge of a straight edge disposed against the sheet 10, said sheet 10 may also be manually positioned or power driven on a mount containing a motor-driven reading head operative to scan a code bearing line manually aligned therewith as selected by the operator. The sheet 10 may also be disposed beneath a sheet of clear plastic embossed or molded with one or more ribs or channels for guiding the reading transducer above and across the row of codes and/or characters selected for scanning. Notation 16, in FIG. 2, is a channel or rib-like protrusion formed in the sheet 10 beneath each line 14 of codes 15 for guiding a shaped portion of the reading implement or pen as described hereafter.

In FIG. 3, a record sheet 20 contains printed matter 21 defined as lines 22 of separate alpha-numeric characters 23, each line describing in language form a particular article, name, destination, formula or other information to be entered. Disposed beneath each line 21 of characters is a strip 24 of magnetic recording material having recorded thereon in pulse or tone form, coded signals such as binary codes representative of the information on the line described by the alpha-numeric printing thereabove.

In FIG. 4, a sheet 10 of paper, plastic or metal contains lines 12 of printed words and numbers defining products or other information. Aligned with each line 12 at the front or end thereof is a line 14' of codes 15' printed or otherwise provided thereon of conventional ink or magnetic ink and adapted to be scanned as described herein. Strips or a band or magnetic oxide or tape may also be disposed along the border area adjacent the portion of the sheet containing the printed matter 21 and containing magnetic recordings of codes aligned with each printed line to be read as described.

The scannable record member may also comprise a sheet of paper or plastic completely coated with magnetic recording material such as magnetic oxide with the described lines of descriptive characters or words printed over the magnetic material. Magnetic recordings of said coded information pertaining to the printed information being provided along tracks predeterminately spaced below or above each printed line.

FIG. 5 illustrates one form of code line scanning arrangement employing a straight edge device 47 such as a ruler or rigid strip of clear plastic which is either completely hand positioned with alignment marks such as marks 17 of FIG. 1 disposed at either or both ends of the line of characters or is hand slid along internal guide means or tracks (not shown) disposed at the sides of the base 31 on which sheet 10 is placed and prepositioned for scanning. The hand-held scanning implement or pen 32*a* comprises an upper shank or handle portion 41 defining the body of said implement which is held between the thumb and fingers of the hand as in handling a writing implement. The lower portion 41' of the implement 32*a* mounts a sensing head 33 which may contain a magnetic pick-up photoconductor such as a light sensitive cadmium sulfide photoelectric cell or phototransistor, depending on the nature of the information being scanned. Power and signal transmitting wires (not shown) connect to the transducer 33 and extend through a passageway in the body of the implement 32*a* and out of the upper end as shown in FIG. 1. The head 33 may also comprise a lens or end fitting for a so-called optical fiber or fiber bundle operatively coupled to a photoelectric-cell mounted within the upper portion 41 of 32*a*. A small lamp 45' directs light against codes on sheet 10. The lower part 41' of member 32*a* contains a rear wall portion 44 adapted to abut the upper edge 48 of straight edge unit 47 and to be guided thereby in lateral travel across the sheet 10 so as to always scan the line of characters 14. Prepositioning of the end of transducer 33 above the line of printed matter may be effected as the lower end-face 45 of portion 44 slidably rides across the surface of the sheet 10. In another form, the rear portion 46 of the lower portion 41' of member 32*a* may be shaped as illustrated by broken line notation to ride along the upper face 48' of straight edge 47 and the edge 48 thereof as guided by hand across the sheet 10. The portion 44 or 46 may be provided with a ball roller means or Teflon plastic low friction coating to reduce wear.

In FIG. 6 is shown another scanning and reading arrangement in which the record member 10*a* is a sheet of plastic or metal formed with raised portions or ridges 10*a'*, 10*a''*, etc. with at least one such ridge extending parallel to each line of characters and code recordings for use as a guide for a hand held reading implement or pen constructed as described. The reading pen 32*b* has an upped shank 49 and a tapered lower end portion 50 defining a tip or nose at the end of which is disposed a magnetic pick-up or light sensitive transducer arrangement as described. The lower portion of the sidewall of the nose portion 50 is adapted to ride along the side and upper wall of ridge formation 10*a'* as shown so as to locate the transducer or pickup 33 in sliding engagement with a selected line 14 of code recordings 15 on the upper surface of record member 10*a* which code lines are predeterminately located with respect to the rib or ridge formations 10*a'*. Notation 10*a''* refers to a rib formation in the sheet 10*a* which rib is hollow in structure and is formed by vacuum forming said sheet rather than pressure mold forming same as is the rib formation 10*a'*.

The sheet 10*a* may also comprise a sheet of transparent plastic or glass underneath which is placed a sheet of paper or plastic containing character and code recordings as described to be sensed by photoelectric detection means such as a phototransistor or photoelectric cadmium sulfide cell or the like mounted in the pick-up head 33 or optically coupled thereto and mounted within the upper or lower shank portions 49 and 50 of the implement 32*b*.

Figures 7, 8:
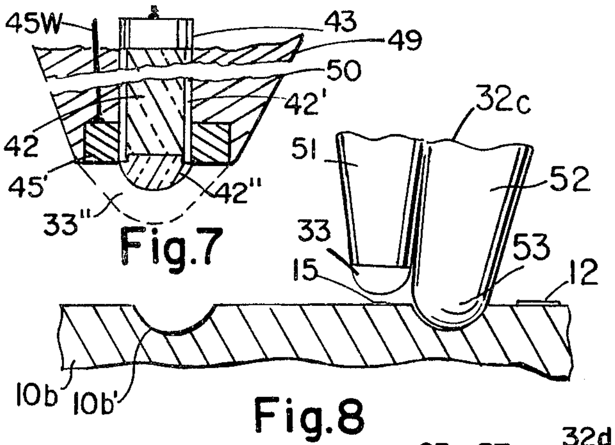
FIG. 7 is a view in cross section of a fragment of a reading device near its tip end showing a light source, light coupling and transducer for reading information scanned thereby.
FIG. 8 is a partial view in side cross section of a record member and a reading device for scanning information recording on said record member, the record member containing guide means in the form of indentations to guide the reading device.

In FIG. 7 is shown details of a photoelectric scanner or detection arrangement for use with a reading implement of the type described herein such as the implement 32*b* or any of the other reading implements described herein. Supported within and extending through a passageway in the lower and upper shanks 50 and 49 of the implement is a light pipe 42 composed either of a single rod or filament of transparent plastic or glass or a bundle of filaments. Disposed at the lower end of light pipe 42 is a button shaped lens 42' serving as the tip end of the implement to ride against or just above the line of code recordings being scanned. Operatively coupled to receive light passed through pipe 42 is a photoelectric detector 43 such as a silicon NPN phototransistor, cadmium sulfide photocell or the like which is also supported within the body of either the upper or lower shank of the implement. A opaque material 42' surrounds or coats the light pipe 42. At the lower end of shank 50 adjacent lens 42'' is an annular light source 45' such as a gallium arsenide light emitting diode which when energized by electrical energy conducted through wires 45W extending from cable 34 through the shank of the implement, provides illumination for the codes being read. Wires (not shown) also extend from the cell 43 to cable 34. Lens 42'' may also be shaped as shown by broken line notation 33' to focus light from source 45' against the surface aligned with the end thereof.

In FIG. 8 the scanning implement 32c is provided with a guide portion or stylus 52 attached to the shank 51 containing the reading pickup or transducer 33 as described. The lower end 53 of portion 52 is rounded and adapted to slide along grooves 10*b'* formed in the sheet 10*b*. The sheet 10*b* may contain said character and code recordings on the upper surface thereof with each line 14 of code recordings predeterminately located with respect to a groove 10*b'* running parallel thereto for guiding the implement to position the pickup 33 against or directly above a line of recordings to be scanned. Sheet 10*b* may also be a transparent sheet disposed above a sheet of paper containing said recordings aligned with the grooves 10*b'* for photo-optical scanning.

Figures 9, 11:
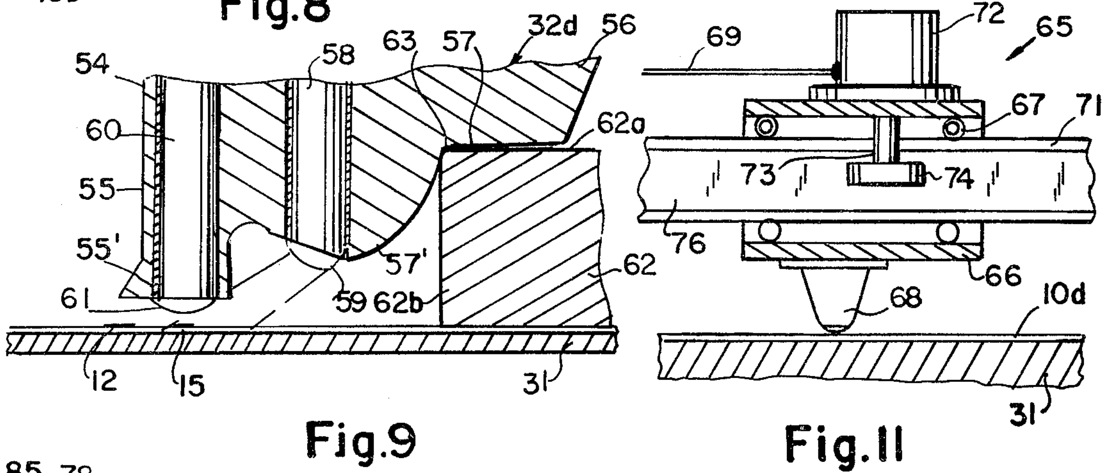
FIG. 9 is a partial side view in cross section of an electro-optical reading device, guide means therefore and record member to be read by said device.
FIG. 11 is a partial view with parts broken away for clarity of a reading device operative to travel a track and record member predeterminately positioned with respect to said reading device.

In FIG. 9 the end portion 55 of a scanning implement 32*d* is shown terminating an upper shank 54 as described and contains embedded or secured therein a first fiber optic element or bundle 60 extending from a photoelectric detector such as that provided in FIG. 7. A lens 61 coupled to the end of light pipe 60 receive light reflected from the line of recordings being scanned and transmits said modulated light thru pipe 60 to variably energize said photoelectric cell. Scanning illumination is transmitted from a light source (not shown) in the upper shank 54 through a fiber-optic element or bundle 58 to a lens 59 at the end of element 58. The lens 59 is shaped so as to direct light against that portion of the sheet 10*c* being scanned by elements 60 and 61. The device 32*d* is shaped somewhat like the reading device 32*a* of FIG. 5 which may also have a light source 45' or light-transmitting optical fiber terminating at the end 45 thereof. However, device 32*d* is provided with an indentation or step formation 56 having an upper surface 57 and a side surface 57' shaped to conform to the upper and side wall surfaces 62*a* and 62*b* of a guide 62 such as a ruler or bar having a straight edge 63 for guiding the implement 32*d* therealong. If the guide 62 is located so as to dispose the edge 62 parallel to and a predetermined distance away from the line 14 of code recordings 15 to permit the proper reading thereof by the transducer or fiber-optic element 61, suitable reading of the codes disposed along the line 14 and defining the content of the printed information 12 may be effected by manually drawing the implement along the upper and side wall surfaces of the guide 62 from one end of the line of characters or codes to the other. Proper alignment of the guide 62 with a selected line of characters and code recordings to permit such scanning function may be effected by suitable alignment marks such as marks 17 of FIGS. 2–5 at either or both ends of the selected line of characters or codes. Notation 55' refers to a V-shaped portion of the front wall of the implement 32*d* located near the end thereof and serving as a pointing or aiming means to indicate which character or character code is being scanned. In other words, if a selected line of characters contains information, only part of which is desired to be scanned and entered into a computer or used to control a display device or electric typewriter, by providing suitable switching control means as will be described hereafter, the implement 32*d* may be manipulated so as to scan the codes of just selected characters, words or symbols by visually aligning the transducer or transducer lens 61 with the particular character, words or symbol by means of the pointer 55'.

Figure 10:
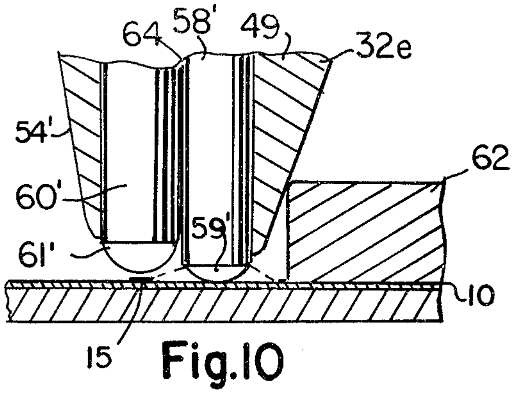
FIG. 10 is a partial side view in cross section of a modified form of the reading device shown in FIG. 8.

A modified form of the implement of FIG. 9 is shown in FIG. 10 which comprises a reading device 32e having a shank 54' containing a first light pipe or optical fiber bundle 58' disposed alongside a second light pipe or fiber bundle 60' with the interface between the two being coated with an opaque material 64 so as to prevent light from passing between the two. A lens 59' is coupled to the optical pipe 58' and is adapted to direct light piped therealong from a light source (not shown) in the upper shank 54' so as to illuminate code marks being scanned by a lens 61' at the end of pipe 60'. The pipe 60' extends to a photoelectric cell or other suitable photo-sensitive transducer located in the upper portion of the shank or support 54' for the implement 32*e*.

It is to be noted that in the structures of the scanning devices illustrated in FIGS. 6–10, all may contain a photoelectric cell or detector mounted at the very end and defining the tip of the device adjacent a miniature light source such as an incandescent lamp or photoconducting light source disposed in a housing and having a lens enclosing same which is shaped and disposed so as to direct light against the code markings of a selected line of characters when the adjacent scanning means is properly aligned therewith. The structures shown in FIGS. 9 and 10 illustrate adjacent fiber-optic elements or bundles such as 58, 50 and 58' and 60' operative to conduct light respectively from light sources and to respective photo-electric detection means (not shown) mounted in the upper portion of the supports or handles of the implements. The scanning devices of FIGS. 6, 7, and 8 may utilize either a photoelectric cell mounted at the tip ends thereof for reading the characters or a combination lens at the tip coupled to an optical fiber element or bundle which is coupled at its other end to a photoelectric cell mounted in the upper shank or handle of the implement. If a light source or fiber-optic element conducting light is utilized, the light thereof may also be directed against the line of printed characters so as to illuminate same to facilitate reading by the operator and proper positioning of the reading pen. The devices of FIGS. 7 and 10 may also be provided with a notch along the side wall thereof to guide same along a straight edge such as 63 of FIG. 9 or a ridge provided in the sheet of characters by shaping such as illustrated in FIG. 6. It is noted that the structures shown in FIGS. 6 and 8 may also define a magnetic pick-up means for the transducer elements or reading heads 33 for reading magnetic recordings provided in the structures illustrated in FIGS. 1e and 3, for example. To minimize wear against the magnetic recording material containing the code recordings or the printed, optically readable recordings read by the contacting devices shown in FIGS. 5, 6 and 8, the sheet materials on which said recordings are provided may be disposed beneath suitable wear-resistant plastic sheeting or coatings and/or the reading implement may have the surface of the tip portion thereof immediately adjacent or surrounding the reading means coated with a low-friction material such as polytetrafluorethylene.

The reading implement structures shown in FIGS. 5–10 may, in addition to being applied to hand-held implements, also comprise support means which projects downwardly from carriages operative to be manually or motor driven along a track supported above the page of printed characters and code recordings. In FIG. 11, reading apparatus 65 includes a carriage 66 operative to travel along a track 71 which is supported at both sides of the base supporting the sheet 10d of characters. Either the track 71 or the sheet of characters may be movable to bring the reading transducer 68 which may be made in accordance with the teachings of FIGS. 6 and 10, into alignment with a selected line of character code recordings provided on the sheet 10*d*. Thereafter, the carriage 66 is moved along the track 71 to cause the transducer at the end of support 68 to scan a selected line of code recordings as described. Notation 67 refers to rollers or wheels for supporting carriage 66 while notation 69 refers to an electrical cable extending from the transducer in mount 68 to a cable extending to one end of the track 71. Notation 72 refers to a constant speed electrical gear motor mounted on carriage 66 and having an output shaft 73 with a friction wheel 74 mounted at the end thereof and adapted to frictionally engage the side wall 76 of track 71 for driving the carriage 66 along said track. In a particular form of the embodiment, the carriage 66 may be either manually pushed along the track 71 or motor driven depending on whether the operator seeks to scan a complete line of character code recordings or code recordings of a few characters selected from a line thereof.

Figure 12:
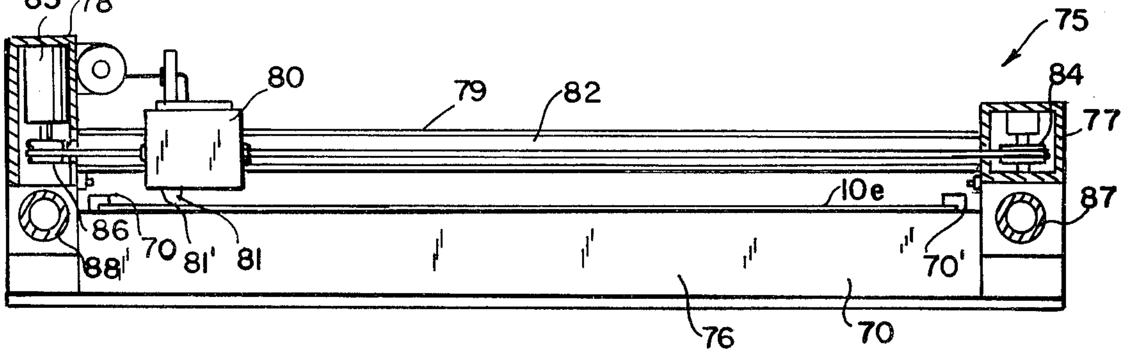
FIG. 12 is an end view of a motorized reading device which is a modified form of that shown in FIG. 11.

FIG. 12 shows a modified form of the scanning means of FIG. 11 wherein the scanning apparatus 75 includes a base or table 70 having an upper surface containing means 70' such as a plurality of clamps or stops for predeterminately aligning a sheet 10*e* of printed information in the form of parallel lines of characters as described and coded information which is printed or magnetically recorded thereon adjacent each line of characters, also as described. When a selected sheet 10*e* of information is predeterminately aligned in two directions on the upper surface 70' of the base 70, a carriage 80 containing a reading transducer 81', of the type described, supported at the end of a transducer mount 81, is automatically or manually moved across a track 79 supported above base 70 by respective carriage elements 77 and 78 which are operative to travel the direction which is normal to the scanning direction across the page along respective tubular tracks 87 and 88 supported at their ends near the ends of the table 70 by respective brackets (not shown). Power to drive the carriage 80 across track 79 is effected by means of a constant speed electrical gear motor 85 supported by carriage 78 and having a sprocket wheel 86 on its output shaft. A chain or belt 82 wraps around sprocket wheel 86 and is connected at one end to one side of carriage 80. The belt 82 extends around a pulley 84 which is rotationally supported by the other carriage 77 and doubles back to connect to the other side wall of carriage 80 so that when motor 85 is operating in a first direction, the carriage 80 will travel along track 79 in a first direction. When motor 85 is reversed, the carriage 80 will travel along track 79 in the reverse direction. While manual means are preferably employed to position the laterally extending track 79 so as to locate the transducer 81' in alignment with a selected line of character code recordings on the sheet 10*e*, motor means may also be provided to either move the track assembly 79 to position the scanning transducer 81' in alignment with a selected line of code recordings or to position the sheet 10*e* so as to bring the transducer 81' into alignment with a selected line of code recordings.

Figure 13:
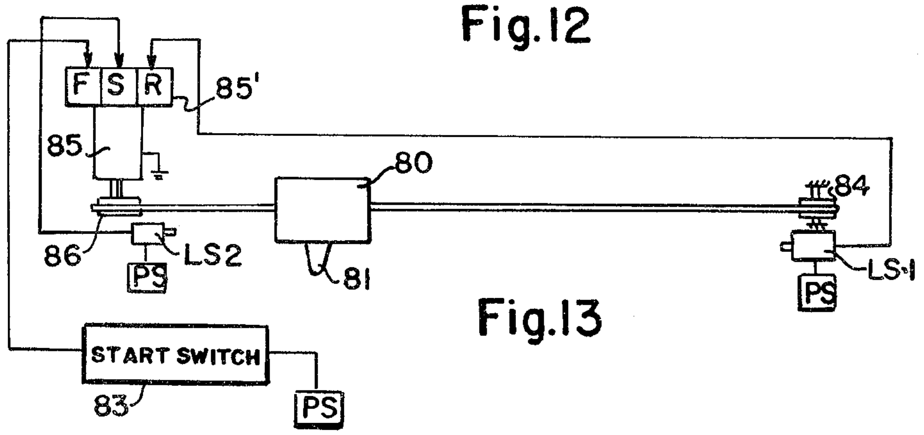
FIG. 13 is a control diagram for the reading device of FIG. 12.

In FIG. 13 is shown a control system for the apparatus of FIG. 12, which includes a start switch 83 connected to the forward drive control F of the controls

85′ for the motor 85 which initiates drive of the carriage 80 from a home position at one side of the track 79 along the track to near the other end thereof where the carriage 80 is driven against the limit switch LS-1. The output of limit switch LS-1 is connected to the reverse control R for motor 85 which reverses the drive of said motor and causes the carriage 80 to return to its home position at the end of scanning a single line of character recordings. The output of switch LS-1 may also be operative to deactivate either the light source or the transducer mounted on the carriage 80 so that it will not read recordings disposed along the sheet being scanned during its reverse travel to its home position. Means such as a bi-stable solenoid or motor (not shown) may also be provided if the reading transducer or tip of the scanning means engages the surface of the sheet containing the recordings, for retracting same during the return travel of the carriage to its home position in response to the operation of switch LS-1. When the carriage is at its home position, it operates to actuate a limit switch LS-2 which is connected to energize the stop control S for motor 85 to properly stop the carriage at the home position. The start switch 83 for a reading cycle may also be operative to close a switch gating electrical energy to the reading transducer and/or the light source accompanying same as described to initiate a reading cycle.

FIG. 14 illustrates part of a control system for a reading device as described and operative to photo-optically read printed or photographic recordings of codes, as described, containing specific tone or code generating marks disposed prior to and immediately after each code or tone recording of a character, word or line. The apparatus 90 is operative to gate only those signals generated by the reading transducer in scanning selected information to a receiving device 95 such as a computer and/or any of the described receiving means of FIG. 1.

In FIG. 14, the transducer 33 is energized with electrical energy from a power supply PS when a switch 32′ is closed such as by finger pressure, foot switch or other means. The output 34′ of transducer 33 extends to the input of a switch 92 and to inputs of respective relays 92*a* and 92*b* which operate respectively to close and open switch 92. When a first control recording disposed at the beginning of a line, word or ahead of a selected character code recording is first scanned by transducer 33, it causes a first electrical tone signal to be generated on the output 34′ thereof which is transmitted to relay 92*a* which is responsive thereto and is operative to close switch 92, thereby permitting the signal or signals generated thereafter by transducer 33 and scanning the selected code markings to pass to the output 93 of switch 92 which extends to the computer, display unit and/or electric typewriter or print-out unit 95. When the transducer 33 scans a second control recording at the end of the line, word or character code recording, a second control tone signal is generated on line 34′ and is passed to relay 92*b* which is energized thereby and is operative to open switch 92, thereby preventing any further signals generated by transducer 33 from passing to the output 93 thereof until switch 92 is again closed. Should the transducer 33 fail to scan the second control recording for any reason, a timer 94 which is simultaneously energized when the switch control relay 92*a* becomes energized, is operative to generate a signal at a predetermined time after switch 92 has been closed so as to open said switch. The time interval of time delay relay or timer 94 may vary from about a second to several seconds or more, depending on the nature of the reading operation.

In FIG. 15 is shown in block diagram notation means for converting tone signals generated simultaneously or sequentially by scanning marks printed or photographically reproduced in different shades of gray or color as illustrated in FIG. 1*d* or tone signal recordings provided on magnetic recording areas such as shown in FIG. 1*e*. The output 34′ of the scanning transducer 33 is operatively connected to a frequency matrix 96 composed of a plurality of tone or frequency responsive relays 96*a* to 96*n*, each of which is responsive to a particular tone signal generated on the input line 34′ and is operative to generate a pulse signal on its output when energized by its particular frequency signal. The outputs 97 of the tone responsive relays 96 extend to respective transducers 98*a* to 98*n* of a bank 98 of said transducers which are operatively connected to record the pulse signals in parallel binary code notation on a recording member 99′ comprising, for example, a magnetic recording tape, drum or disc of a recorder or computer 99 which would otherwise record the codes generated by the tones generated on the input line 34′ as a result of scanning the character tone recordings. A tone signal generated by scanning a particular color or gray scale marking 15*d* may, for example, be operative to energize a number of the tone responsive relays 96 to the exclusion of others or a plurality of such marks 15*d* may be disposed parallel beneath or across the printed character 13 to be scanned by respective photoelectric cells defining the transducing means (i.e. a plurality of cells disposed to scan different levels of the characters or codes therefore) so as to generate a plurality of different tone signals simultaneously on the input line 34′ which extends to all of the relays 96 of the matrix thereby generating simultaneous signals on the parallel outputs 97 of 96 so as to define, for example, a parallel binary code with each code representative of the character associated with the code marks scanned to generate said code.

If the codes generated on the outputs 93 and 97 of the apparatus of FIGS. 14 and 15 are applied to operate a printer such as an electric typewriter, the existence of the code signals on the electrical input to said typewriter may be utilized to operate the typewriter per se or in accordance with how the codes energize a control unit of the typewriter. Suitable code or mark recordings between words of the information being scanned may generate signals which are operative to cause the typewriter or printer mechanism to provide spacings between words. If the output to which the code signals are passed is a recorder such as a magnetic recorder, then it may be desirable to operate the motor or clutch means for effecting movement of the record member or tape thereof past the recording head or heads only during the reading or scanning operation. The recorder may, of course, be started and stopped in its operation by manual means such as a switch which is closed by the operator just prior to initiating a reading or scanning operation and opened thereafter. A more suitable arrangement is shown in FIGS. 14 and 15 whereby the activation or closure of the reading switch 32′ is operative to start the recorder drive motor and the opening of said switch is operative to effect stoppage of the recorder drive means. Connected across a second set of contacts or leads of switch 32′ is a relay 95*c* which, when activated by closure of the switch 32′ is operative to energize an input 95' to the recorder 95 for operating the drive means for the record member thereof and condition the recording transducer thereof for recording the code or tone signals generated on the output 34'. When switch 32' opens as described, the relay 95c becomes deactivated so as to deenergize input 95' causing the drive for the record member of the recorder 95 to stop or become uncoupled. It is noted that the outputs of tone responsive relays 92a and 92b may also be connected to a bistable switch so as to respectively open and close same for starting and stopping operation of the motor driving the record member of the computer or recorder 95.

In FIG. 15 an output 32'' of switch 32' connects to a control input 99'' of the recorder or computer 99 so that when the switch 32' is closed, energy from power supply PS will energize said input 99''. If the drive motor for the recorder of apparatus 99 is connected to the input 99'' it will be energized to drive the record member whenever switch 32' is closed. Code or tone generating recordings on member 10 may also be operative to start and stop the drive motor of the recorder 99 as described in FIG. 15 by controlling opening and closure of a bistable switch having its switching inputs connected to the outputs of tone responsive relays 92a and 92b.

In other forms of the invention an apparatus of the type illustrated in FIGS. 11 and 12 may be operative to scan just a selected number of character or character code recordings of a selected line thereof, the selected number of characters and/or the line on which they are recorded being automatically scanned by said carriage mounted transducing means. In one form, the track 79 on which the carriage 80 is mounted is power driven along the parallel side tracks 87 and 88 by a motor which is automatically controlled by an uncount counter receiving feedback signals generated as the assembly of components 77, 78 and 79 travel the side tracks 87 and 88 to predeterminately stop said assembly with the transducer 81 aligned with a selected line of characters or code recordings of characters whereafter automatic control means for starting the motor 85 to drive the carriage 80 across track 79 in scanning said selected line of recordings. In another form, the track 79 may be stationery while a motor means is automatically controlled to drive the sheet of recordings 10e at right angles to the track 79 and position a selected line of recordings in alignment with the transducer 81'.

In yet another arrangement, a selected portion of a line of recordings or a selected number of such recordings occupying a line and being less in number than the total recordings on said selected line may be automatically scanned to the exclusion of the remaining recordings on said line by computer or automatic control of the carriage drive motor 85 and/or the output switch 92. Counting means including an uncount counter with a control switch operated upon uncounting may be used to control either said motor or switch 92 to provide output signals of just selected recordings. Said counting means may count marks along each line of recordings or the reproductions of the code recordings to effect said automatic reproduction control. Special code, grey scale or color recordings at the end of each group of codes on a line such as codes representative of words may also be used to effect automatic control of the lateral movement of the carraige and the output switch 92.

The drawings hereinabove described have been simplified to avoid complexity and to teach primarily the basic elements of the invention without illustrating or describing components or parts which would be obvious to one studying the drawings and skilled in the art. Accordingly, it is assumed that the correct power supplies are provided on the correct sides of all electrical components such as motors, relays, switches, transducers, controls, light sources and the like. Whereas magnetic recordings of code or tone signals are shown as provided on strip-like magnetic recording material, it is noted that the entire sheet may be coated with a magnetic recording material with the words or a phanumeric characters printed thereover in the proper ink.

In a further form of the instant invention, it is noted that the described reading devices including both the hand held and motorized reading units may also be operative to scan printed alpha-numeric characters in the form of intelligible information or coded form in a manner to provide analog or digital type signals on their outputs which signals may be digitized or otherwise operated on by a computer to provide coded information capable of being handled by digital computing apparatus. One or a plurality of photoelectric cells may be employed in said reading devices in the scanning of said printed alpha-numeric characters to generate said output signals.

It is also to be noted that the instant invention embodiments which employ a motor driven carriage supporting a scanning transducer finds certain basis in application ser. no. 622,650 filed Mar. 13, 1967 for Document Reading Apparatus and Method, now U.S. Pat. No. 3,555,246.

Of the various applications of the reading device described herein, mention was made in FIG. 1 of applying the output of the reading device or pen to an automatic communication system 39 as well as to other devices and systems. It is therefore noted that the apparatus of FIG. 1 may be employed to perform either or both the functions of generating different tone signals representative of selected information to be transmitted over a connected telephone line to a remoate monitor, recorder or computer and/or tone or code signals directly on the telephone terminal circuit and representative of the number or telephone terminal circuit called for effecting automatic circuit connection therewith by performing switching and connection functions at the telephone exchange or switching system to which the telephone of the reading device is connected. The sheet 10 of printed and code information may include lines of alpha-numeric characters defining the names of persons, companies or other destinations to be called with each line having associated therewith, as described, a line of recordings of pulse trains or tones of the same characteristics generated when the telephone dial or pushbuttons are activated in calling said terminal circuits at said destinations. If the output 34 of the reading device 32 is properly connected to the telephone terminal circuit, then causing the reading tip 33 thereof to scan a selected code or tone generating line of recordings on the sheet 10 will effect the automatic connection of said terminal circuit to which device 32 is connected with said selected terminal circuit of said telephone system to permit the operator to talk thereafter and/or to generate further code or tone-code signals to transmit information on the connected line to a recorder or computer thereat and/or to effect two way communication with said computer or other device at said connected terminal circuit.

If the output 34 of the reading device 32 is not directly connected to the terminal circuit of the telephone system, it may be acoustically coupled thereto by providing proper amplifying and transducing means for transducing the variable frequency signals generated on output 34 to sounds of corresponding frequency and acoustically coupling said transducing means to the headpiece or earpiece microphone of the telephone. Accordingly, the proper amplifier and speaker may be connected to the output 34 and a rest provided to receive the earpiece of the telephone next to said speaker. Reference is made to my copending application ser. no. 279,031, now abandoned and showing automatic switching and connection information transmission system.

In certain applications of the instant invention it may be desireable to modify the described reading devices to permit the simultaneous scanning of a plurality of parallel bandlike recording areas or tracks of the record member 10 for simultaneously reproducing code signals from a plurality of parallel tracks such as binary digital signals 15*a* of FIG. 1*a* or for digitizing the printed alpha-numeric characters 13 to provide coded pulse outputs which may be fed to a computer for analysis and automatic reading purposes. Accordingly, the tip 33 of the reading pen or the scanning configurations 68 and 81 of FIGS. 11 and 12 may be modified to include one or more of the following configurations:

I. A single optical pick-up may be replaced by a plurality of pick-ups which are spaced apart at the tip end of the reader to scan different predetermined levels of a line of characters or different lines of code markings. These pick-ups may comprise separate photoelectric detectors such as separate phototransistors which are predeterminately spaced apart and mounted at the tip 33 or 81' and located such that when the implement is properly aligned with the printed sheet of information, each will scan a respective level or line of code markings.

II. The single optical fiber or fiber bundle described may be replaced by a plurality of single fibers or fiber bundles each terminating at the tip and located a predetermined distance from the others so that each will scan a different level of a line of characters or a different code track when the implement is properly aligned with the information being scanned. The other end of each fiber or bundle terminates within the housing or handle of the implement and is soupled to feed light transmitted therethrough to a respective photoelectric cell such as a separate phototransistor supported within the housing. Each of said photoelectric cells has its output connected to a separate line extending from the implement or scanner housing to the input of the computing mechanism which is operative to analyze the results of scanning or to a parallel to series code converter for generating series pulse trains thereof. Such converter may also be mounted within the handle or housing for the scanner.

III. The single described magnetic reproduction head or pickup mounted at the tip of the scanning implement or device may be replaced by a plurality of such pickups closely spaced to reproduce simultaneously from a plurality of tracks of the record sheet such as tracks 24*a*, 24*b* and 24*c* of FIG. 1*e* or a plurality of record tracks existing on any of the record areas 24*a*, 24*b* and 24*c*.

In any of the above embodiments, where the implement 32 is hand held and hand guided across an information containing area of a sheet of recorded matter, means are preferably provided to aligning the implement and retaining such alignment as to permit the proper parallel scanning of all pickups of the recorded information. For example, the rear wall of the implement may be shaped as in FIG. 9 with the portion 57' having a flat surface conforming to the flat vertical surface 62*b* of the guide means 62 so that when the surfaces 57 and 57' abut the surfaces 62*a* and 62*b* of the guide all the scanning means at the tip will be properly aligned with respective levels or tracks of the record mamber provided that the guide is properly aligned therewith and will be retained so properly aligned during the entire scanning operation as long as said surfaces are in sliding contact with each other and the guide remains so aligned.

The apparatus described is operable to perform a variety of different data entry functions without the need to adjust or vary the reading device to accommodate such functions. In addition to being able to read and convert entire lines, paragraphs or pages of data to code for various purposes such as those described. Or data such as that referring to purchase of products, inventory, computer machine tool or process commands, mathematical and chemical formulas, art and composing, etc. may be rapidly generated by selectively scanning information contained on one or more pages of coded matter.

In FIG. 16 is shown a typical work sheet 100 which is preferably disposed and predeterminately located as in FIGS. 5 or 6 on a supporting member 31 with all the coded data thereof being easily accessable to the scanning implement 32 of the operator. The sheet 100 contains printed thereon groups of related information visually readable as alpha-numeric characters or symbols and associated lines of code recordings arranged in orderly arrays to permit the operator to rapidly position the reading implement at a plurality of locations on the work sheet and if necessary, one or more other work sheets and move said implements as described to generate desired information in code form as a result of plural, selected scannings.

The printed matter on sheet 100 which includes intelligible information in the form of characters defining numbers and words is provided on separate areas of the sheet, preferably in columns and or rows which are space separated from each other by border lines 101. The data groupings shown are provided as typical and would vary in format including location from sheet to sheet depending on the type and amount of information to be employed in the system and the estimated frequency of its use. Each code recording may be provided in any of the forms hereinbefore described to define a unit of information such as a character, word, phrase, line, command or symbol representative of a machine or computer operation, mathematical operation, formula, etc.

In a first column 102 is provided printed matter 103 arranged as words or readable codes and which provides in human readable form descriptions of such variables as parts numbers, catalog representations of parts, assemblies, finished goods or raw materials, cross reference indicia, product symbols character or symbol representations of formulas, machine commands, etc. arranged in parallel lines therein. Printed or otherwise recorded beneath each symbol, character or group of characters in the space occupied by column 102 are codes 104 representative of the information associated with the respective characters or symbols. Each line of codes extending across the column 102 is preferably composed of separately readable codes for each word, group of words, symbol or otherwise presented discrete information. One means for providing such discrete information in separately readable form is to space it from the adjacent discrete information on both sides thereof on the same line such that the operator may selectively read such information to the exclusion of adjacent information on the same line by selectively scanning just the information he desires with the reading implement. He may selectively operate switch 32S to reproduce just the selected information or may rely on initiating recordings 105 at the start of each implement readable code and terminating recordings 106 each of which is of a respective recording characteristic to gate the output of the implement 32 or its amplifier on at the start of scanning a character or word code and off after a character or ward code has been scanned so that the operator may selectively generate codes of characters words, groups of words or complete lines of information as he chooses by the means provided in FIGS. 14 and 15.

Notation 107 refers to a column or area of sheet 10 containing recordings 108, 109, 110, 111, etc. and corresponding visual indicia, symbols or characters 112, 113, 114, 115, etc. identifying and defining the recordings 108–111. The recordings 108–111 plus respective start and stop signals for each may define instructions for commands for the computer, calculator or other device operative to receive the information code signals generated by the implement 32 such as mathematical instructions to add, subtract, multiply, devide or perform other operations with respect to the generated code data. The recordings 108–111 may be selectively reproduced by the operator's properly positioning of his reading implement above or against the particular code recording adjacent the character or symbol thereof. The recording may comprise printed or otherwise provided codes in the form of bits or frequency generating recordings. The latter may comprise printed areas in the form of variations of the grey scale or variations in color which generate different frequency signals on the output of implement 32.

Column 116 contains characters 117 comprising word descriptions of the product, formula, material or other information forming part of the system in use. These may or may not be accompanied by respective word or character codes 118, the function of which may be derived for certain data processing operations by scanning the codes 104 found existing on the same line across the sheet 100. However, for data processing functions where it may be desired to print out a description of the article material or other information found in column 107 for billing or other descriptive purposes and if it is desired to provide the operator with the ability to reproduce selected portions of the information found on a line in column 107, character codes may be provided below each character word in column 107 to be selectively scanned as described. Depending on the spacing of the information defining characters, symbols, words, phrases, etc. on sheet 100, each such separately reproducible amount of information may have recorded therealong or in alignment therewith below or above the human readable information, a start code or tone generating recording such as 105 for initiating, when scanned, playback or gating of the associated coded information and a terminating code or tone generating recording such as 106 for effecting the reproduction or gating of just the information which the operator desired to reproduce. The logic circuitry connected to the reading implement may be such that if the operator inadvertently scans past a selected recording of a code for a word, symbol, command, phrase or other unit of information in a stroke which includes the start signal and part of the next unit of information but not the stop signal therefore, such code information relating to the next unit of information will not be gated to whatever device or circuit is receiving same.

It is also noted that the stop signal recording for one unit of recorded information such as a character, symbol, word, phrase or command, may comprise the start signal recording for the next unit of information aligned with the previous unit of information wherein sequential start and stop signals or signals disposed between each code recording in a line are such as to properly gate the codes completely scanned to whatever device or circuit is adapted to receive and record or otherwise use same.

To assist the operator in aligning his scanning implement with the proper recorded code recordings, especially if such code recordings are quite small or otherwise difficult to visually read such as magnetic recordings on a magnetic strip, vertical marks 104' may be printed across or beneath each code recording and bracketing each of the characters, symbols, words, phrases, etc. which are printed on the sheet 100 and are associated with the code being reproduced.

This it is seen that an operator, provided with one or more sheets such as 100 of FIG. 16 containing large quantities of visually readible information in code, symbol, word, phrase and sentence or command form or even as separate characters which are separately reproducible for composing words, numbers and mathematical formulas, may compose his own sentences, inventories, commands for machines or computers, accounting records, and perform many data generating and control functions by selectively manipulating the reading implement by hand to cause it to scan codes representative of the visually readible information it is desired to compose into desired information or commands.

If the information provided on sheet 100 of FIG. 16 has to do with ordering and retail sales, the same reading implement used to compose the order or bill may also be rapidly applied to read a card such as a credit card to generate a code or codes representative of the person placing the order or obtaining purchased goods. In FIGS. 17 and 18 is shown a card reading arrangement wherein a platform 120 is provided as part of or adjacent to the retainer 31 for the record sheet 100 and contains guides 121 and 122 for the lower edge and side edges of a credit card 123 containing printed or raised characters 124 identifying the owner and a code bearing strip 125 extending parallel to the lower edge of the card which strip is positioned when the card is so disposed, such that it may be easily scanned by the hand held reading implement 32. The guide 121 or an extension thereof for the lower edge of the card also serves as a guide for properly disposing the hand reading implement's reading tip 33 in alignment with the code bearing strip 125 of the card when the card is properly located by the guides 121 and 122. When so positioned, movement of the reading implement from left to right against the strip 125 will effect generating of the owner's identification code and its entry into a computer or recorder prior to or after the order or billing codes have been generated by selectively positioning and scanning the same reading implement across selected code recordings of sheet 100. Notation 32' refers to a protrusion at the end of implement 32 for guiding same along the upper surface or edge of guide 121.

In FIGS. 19 and 20 is shown a modified form of credit card 130 containing a code strip 133 which may be easily scanned with a hand held reading implement of the type described without the need to provide a separate guide for the reading head thereof. Provided below the reading or code strip 133 near the bottom edge of the card 130 is a channel-like depression 132 which may be embossed or molded in the upper surface of the card when the raised letters 131 are provided therein. As shown in FIG. 20, the handheld reading implement 134 is provided with a guide-stylus 135 at its end which is shaped to conform to and ride in the channel-like depression 132 so as to guide the reading tip or head 136 across the code strip 133 as the implement is scanned and guided along channel 132. This same structure may be applied to sheet 100 or an overlay clear plastic sheet therefore with means for properly aligning both sheets so that when the guide-stylus part 135 of the reading implement is located in the depression 132 the reading tip of the implement will be aligned with and in reading relation with code bearing strip 133.

The recordings which are scanned by the hereinbefore described hand held implements may be defined as series code recordings containing control code recordings which may be provided to precede and follow each primary information recording of a character, group of characters or words, or line of characters depending on the nature of the recorded primary information and how it may be desired to reproduce same as electrical signals. For example, it may be desired to simultaneously reproduce code signals representative of all the information existing on a complete line or track of the record member and accordingly the control codes will be recorded at the beginning and end of the line or track of information recordings. If the information is of such a characteristic that portions thereof which exist along a line or track may at times be reproduced to the exclusion of other portions, then control codes will be recorded at the beginnings and ends of each such portion.

I claim:

1. A method of generating data comprising:

recording coded information along a track of a first record member, which recording includes coded information defined by space-separated, separately-scannable digital bit recordings having included therewith primary information recordings and control recordings both disposed aligned with each other along said track, with said control recordings disposed at both ends of said track, scanning said track of recorded information with a first transducing means, generating a first electrical signal output on the output of said first transducing means which first electrical signal output is representative of the first of said control information recordings scanned by said transducing means, applying said first electrical signal output to activate a control means for enabling information signals generated thereafter by said first transducing means in scanning said primary information recordings to be transmitted from said transducing means to a receiving means, and receiving said primary information signals at said receiving means and applying same to activate a second transducing means and operating said second transducing means to record primary information transmitted thereto.

2. A method in accordance with claim 1, wherein said coded information is recorded on said first record member as a series of discrete space-separated marks and said first transducing means is operable to photo-optically scan said space-separated marks.

3. A method in accordance with claim 1, wherein said control recordings disposed at both ends of the recordings of said primary information are operable, when scanned and reproduced by said first transducing means to generate control signals for controlling the operation of recording said primary information by said second transducing means.

4. A method in accordance with claim 1 including operating said second transducing means to control a recorder to effect a recording of the primary information received thereby as electrical signals generated when said first transducing means scans said primary information recorded on said first record member.

5. A method in accordance with claim 1, wherein said second transducing means forms part of a printing means, said method including controlling said printing means to operate in accordance with the signals generated in scanning said primary information recordings to effect a printing of said primary information on a record member.

6. A method in accordance with claim 5 wherein said printing means is an electric typewriter and is operable to type print characters representative of said primary information recordings scanned by said first transducing means.

7. A method in accordance with claim 1 wherein said second transducing means is a recording transducer, further including variably modulating said recording transducer with said signals generated when said first transducer scans said primary information recordings and causing said recording transducer to record said primary information on a record member.

8. A method in accordance with claim 7 wherein said second transducing means is a magnetic recording transducer forming part of a magnetic recorder and is operable to magnetically record said primary information, further including operating said magnetic recorder during the interval said primary information recordings are scanned by said first transducing means to effect the recording of signals representative of said primary information on a magnetic recording member of said magnetic recorder.

9. A method in accordance with claim 2 wherein said control information is in the form of a series digital code and is printed on said track of said first record member at both ends of said primary information recordings to be read by said transducing means during a scanning sweep of said track, and said transducing means comprises a hand held implement having a tip portion thereof adapted to optically scan said discrete printed marks defining said recordings along said track, and electrical photodetecting means supported within said implement for detecting variations in light received during the optical scanning of said printed marks as said tip portion of said implement is swept along and across said track, said photodetecting means being operable to generate variable electrical signals on its output which signals vary in accordance with the characteristics of said printed marks and are applied as said control information to said control means and said primary information to said receiving means.

10. A method in accordance with claim 2 wherein said coded information is in the form of recordings operable to modulate said transducing means when scanned thereby to generate tone signals of specific frequencies comprising said control signals and digital code signals defining said primary information.

11. An apparatus for scanning information recorded as printed codes provided along track-defining portions of record members comprising in combination: A support comprising an oblong tubular pen-like housing, defining a scanning implement adapted to be held between the thumb and forefinger of the hand and to be guided in movement across a record member containing coded information to be scanned, said oblong implement having a tapered lower end portion and a light-transmitting lens disposed at the lower end thereof, said lens protruding at least partly from the lower end of said housing and defining a round tip portion of said implement, which tip portion is adapted to engage the surface of a record member and to preposition said implement with respect to said record member surface, a light source located within said tubular housing, means for energizing said light source and directing light therefrom through said lens at the lower end of said implement, whereby light from said source is directed from the protruding end of said lens against the surface of a record member engaged by said lens, a photoelectric cell located within said tubular housing, means for preventing direct light from said light source from entering and energizing said photoelectric cell, means for directing light reflected from a surface engaged by the end of said implement, through said lens at the end of said implement and to said photoelectric cell, whereby variations in the reflected light received by said photoelectric cell will variably modulate the output of said photoelectric cell, and cause said photoelectric cell to generate respective signals in accordance with the light received by said cell, means operable to receive the signal output of said photoelectric cell and generate code signals thereof which code signals are representative of the printed code information across which said protruding lens of the implement is scanned.

12. An apparatus in accordance with claim 11 wherein said means for directing light reflected from a record member scanned by the tip of said implement comprises light conducting means connected to said lens at the lower end of said implement and said photoelectric cell.

13. An apparatus in accordance with claim 12 wherein said light conducting means comprises a light pipe.

14. An apparatus in accordance with claim 11 wherein said light source is disposed immediately adjacent the end of said implement and is operable to direct most of its light through said protruding lens.

15. An apparatus in accordance with claim 14 wherein said light source is an annular member and light reflected from the surface of a record member through said lens is directed through the center of said annular member to said photoelectric cell.

* * * * *

US003918029A

REEXAMINATION CERTIFICATE (1661st)

United States Patent [19]

[11] B1 3,918,029

Lemelson

[45] Certificate Issued Mar. 24, 1992

[54] SCANNING SYSTEM AND METHOD

[76] Inventor: Jerome H. Lemelson, 85 Rector St., Metuchen, N.J. 08840

Reexamination Request:
No. 90/001,707, Feb. 3, 1989

Reexamination Certificate for:

| | |
|---|---|
| Patent No.: | **3,918,029** |
| Issued: | **Nov. 4, 1975** |
| Appl. No.: | **362,676** |
| Filed: | **May 22, 1973** |

Related U.S. Application Data

[63] Continuation-in-part of Ser. No. 160,007, Jul. 8, 1971, Pat. No. 3,735,350, which is a continuation-in-part of Ser. No. 806,398, Mar. 12, 1969, abandoned, which is a continuation-in-part of Ser. No. 665,526, Sep. 5, 1967, which is a continuation-in-part of Ser. No. 526,546, Feb. 10, 1966, Pat. No. 3,499,650, which is a continuation of Ser. No. 826,370, Jul. 10, 1959, abandoned, which is a continuation-in-part of Ser. No. 450,131, Aug. 16, 1954, abandoned.

[51] Int. Cl.[5] .............................................. G06K 7/10
[52] U.S. Cl. .................................. 235/472; 235/468; 235/469; 235/473; 235/495; 400/73; 400/87; 400/165.1
[58] Field of Search ............................... 235/462, 472

[56] References Cited

U.S. PATENT DOCUMENTS

| | | |
|---|---|---|
| 3,049,247 | 8/1956 | Lemelson . |
| 3,211,470 | 10/1965 | Wilson . |
| 3,225,177 | 12/1965 | Stites et al. . |
| 3,238,501 | 3/1966 | Mak et al. . |
| 3,267,259 | 8/1966 | Bailey et al. . |
| 3,359,405 | 12/1967 | Sundblad . |
| 3,417,234 | 12/1968 | Sundblad . |
| 3,550,770 | 12/1970 | Lund et al. . |
| 3,584,779 | 6/1971 | Kessler . |
| 3,610,891 | 10/1971 | Raciazek . |
| 3,663,800 | 5/1972 | Myer et al. . |
| 3,735,350 | 5/1973 | Lemelson . |
| 3,806,706 | 4/1974 | Hasslinger et al. . |

FOREIGN PATENT DOCUMENTS 785605 10/1957 United Kingdom .

OTHER PUBLICATIONS

Manual from Recognition Equipment Inc. entitled "Theory of Operation and Maintenance for the Document Transport Model I Bar Code Reader/Sorter," copyright 1968, 80 pages.

*Primary Examiner*—David L. Trafton

[57] ABSTRACT

A photoelectric scanning system is provided for scanning coded information printed on record members. The system includes a hand held implement having a tubular housing, which implement is shaped and connected to a code receiving unit in such a manner as to permit it to be easily held and manipulated between the thumb and forefinger of the hand in a scanning sweep across the surface of the record member.

In one form, the scanning implement contains a lens disposed at one end thereof which may be easily located adjacent a code printed on a record member and may be guided by hand in the direction of the code to variably reflect light into the implement through a passageway at the tip of the implement and into a photoelectric cell located within the implement. Means may also be provided for guiding the implement in a fixed path across a record member such that a coded track thereof is photo-optically scanned by the implement.

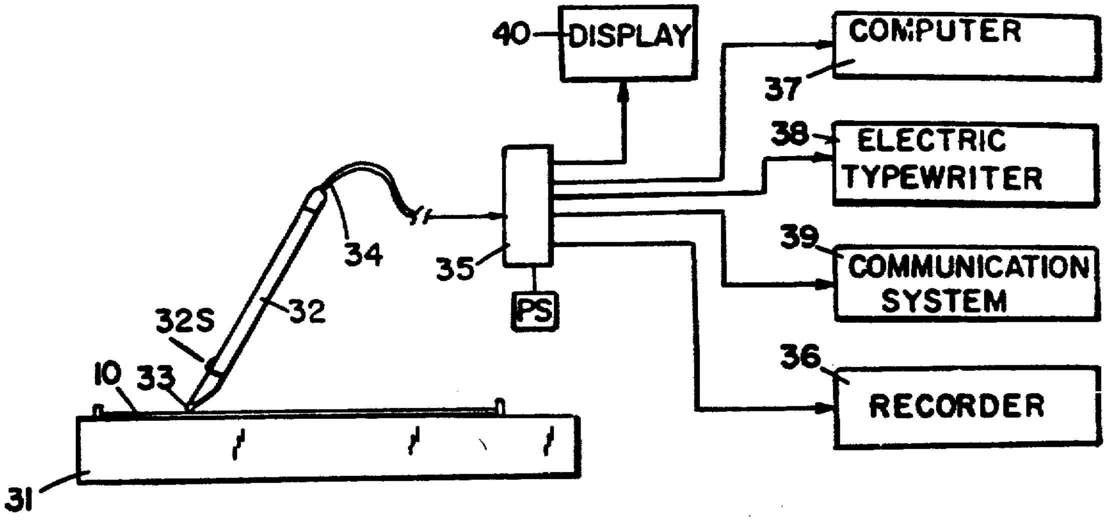

REEXAMINATION CERTIFICATE ISSUED UNDER 35 U.S.C. 307

THE PATENT IS HEREBY AMENDED AS INDICATED BELOW.

Matter enclosed in heavy brackets [ ] appeared in the patent, but has been deleted and is no longer a part of the patent; matter printed in italics indicates additions made to the patent.

AS A RESULT OF REEXAMINATION, IT HAS BEEN DETERMINED THAT:

The patentability of claims 8 and 10 is confirmed.

Claims 1-7, 9 and 11-15 are cancelled.

* * * * *